Sept. 29, 1925.
J. A. SMITH
1,555,765
UNIVERSAL WHEEL TOOL
Filed May 25, 1925
2 Sheets-Sheet 1
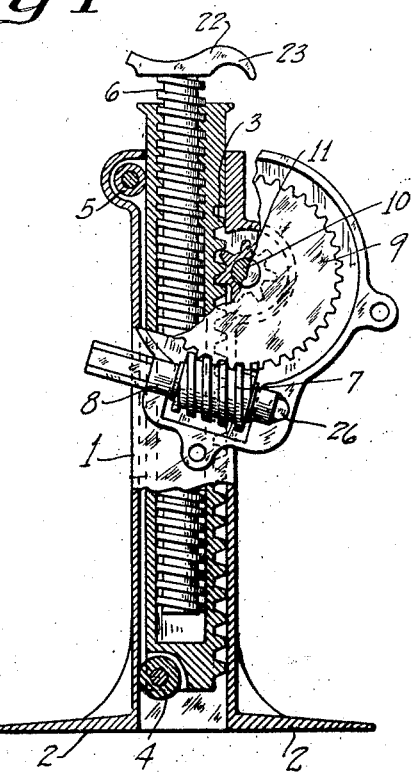
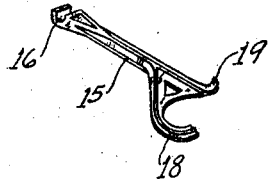
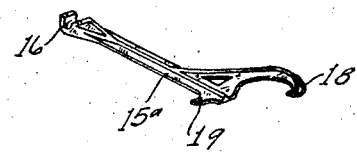
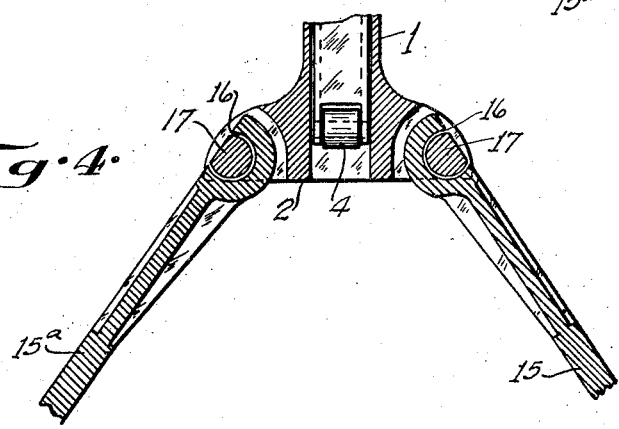
INVENTOR
John A. Smith
By W.L. Dempsey
ATTORNEY Sept. 29, 1925.  1,555,765
J. A. SMITH
UNIVERSAL WHEEL TOOL
Filed May 25, 1925  2 Sheets-Sheet 2

INVENTOR
John A. Smith.
By W. L. Dempsey
ATTORNEY

Patented Sept. 29, 1925.

1,555,765

UNITED STATES PATENT OFFICE.

JOHN A. SMITH, OF EAST ST. LOUIS, ILLINOIS.

UNIVERSAL WHEEL TOOL.

Application filed May 25, 1925. Serial No. 32,697.

*To all whom it may concern:*

Be it known that I, JOHN A. SMITH, a citizen of the United States, residing in the city of East St. Louis, in the State of Illinois (whose post-office address is 916 State St., in said city and said State), have invented a certain new and useful Improvement in a Universal Wheel Tool, of which the following is a full, clear, and exact specification.

My invention relates to tools for handling the wheels, tires and rims of automotive vehicles.

The prime object of my invention is to provide a tool capable of raising and lowering a vehicle, of expanding or contracting a rim, and also capable of withdrawing a wheel from an axle to which it adheres with more or less tenacity, and also to provide a tool that is highly efficient for any of the purposes above-mentioned and occupies a small space for storage and can be made and sold at a relatively low price.

Other and further objects and advantages of my invention will be obvious from the description, claim and drawings.

Referring to the drawings:

Fig. 1 is an elevation of the main body of my tool, partly broken away.

Fig. 2 is a right-hand gripping arm.

Fig. 3 is a left-hand gripping arm.

Fig. 4 illustrates the manner of attaching the gripping arms.

Figure 5:
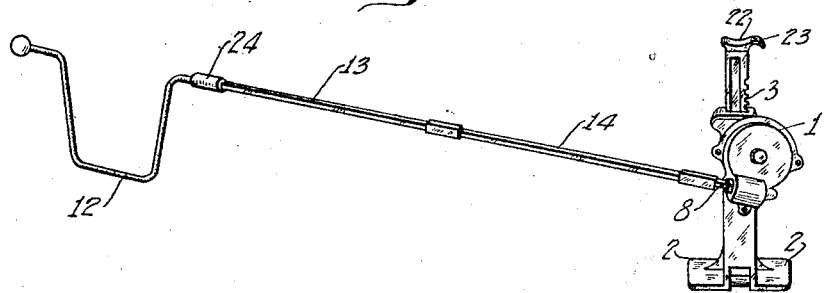
Fig. 5 is a perspective when used as a jack.

It is well known that it is frequently necessary, on account of a blow-out or punctured tire, either to remove the wheel from the vehicle or remove the tire and rim in order to replace the tire, or put on another wheel, which is already equipped with a good tire. This necessitates the raising of the vehicle so that the wheel may become free to revolve, and often when a tire has been in use for considerable time, it is very difficult to remove from the rim without either expanding or contracting the rim, and where it is desired to change the wheel, it is sometimes difficult to remove the old wheel from the axle.

To perform these various operations has, heretofore, required a number of different tools for each operation, and in order to overcome these objections and difficulties, I have devised a tool that is of universal application.

My universal wheel tool may be used simply as a jack to raise the wheel from the ground, or it may be used to expand and unlock a demountable rim, or it may be used to contract the rim, or if the wheel binds upon the axle, it can be used to withdraw the wheel, and a part of the same tool can be used for the purpose of unscrewing the nuts on the bolts that hold the rim on to the felly.

My universal wheel tool comprises a hollow housing 1, substantially rectangular in cross-section, provided with a substantial base 2, projecting from its lower end at right angles to its longitudinal axis. A rack 3 adapted to fit and reciprocate within said housing 1 is provided with a roller 4 at its lower end, adapted to contact with the wall of the housing 1, for the purpose of reducing friction as the rack 3 is reciprocated.

At the opposite end of the housing 1, a roller 5 is adapted to contact with the rack 3 and coact with the roller 4 in reducing friction in the reciprocatory movement of the rack 3.

The rack 3 is bored and tapped out at its upper end adapting it to engage a screw-threaded member 6, by means of which additional adjustment is provided. A worm wheel 7, mounted upon a rotatable shaft 8, provided with suitable bearings in the main housing 1, engages a worm wheel 9, which is adapted to rotate with the shaft 10, to which it is rigidly attached, causing the pinion 11, also rigidly attached to the shaft 10 and adapted to mesh with the rack 3, so that when the worm 7 is rotated it causes the worm wheel 9 to transmit rotary motion to the pinion 11, thereby causing the rack 3 to rise or fall depending upon the direction of rotation of the worm 7.

The worm 7 is rotated by means of a detachable brace 12, having extensible arms 13 and 14, adapted to fit the hexagonal end of the shaft 8, either when the two arms 13 and 14 are joined together, or when used separately.

A gripping arm 15 is provided at one end with a semi-circular groove 16, adapted to pivotally engage a bearing 17, cast integral with the main housing 1, the opposite end of the gripping arm 15 being provided with two hooked portions 18 and 19, adapted to grip and hold a tire rim 20, or the spokes 21 of a wheel.

An identical but reverse gripping arm 15ª performs the same function as the gripping arm 15 the difference being one is for the right-hand side and the other for the left-hand side.

The screw-threaded member 6 is provided with a head 22, adapted to either fit an axle when lifting a car or the inside of a rim when expanding it, and the hooked-end portion 23 is adapted to grip and hold a rim when being contracted.

The brace 12 is provided with a hexagonal socket 24, adapted to fit the extensible arms 13 and 14, and also the end of the shaft 8 and the hexagonal nuts usually used on demountable rims, so that the brace is a handy tool for any of the purposes above mentioned.

Figure 6:
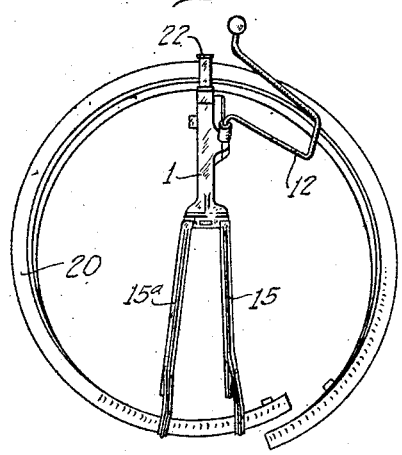
Fig. 6 is a plan view used as a rim contractor.
Figure 7:
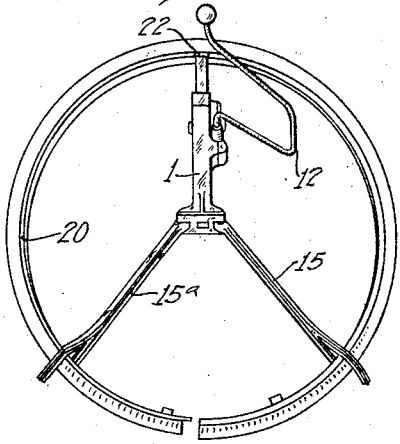
Fig. 7 is a plan view when used as a rim expander.
Figure 8:
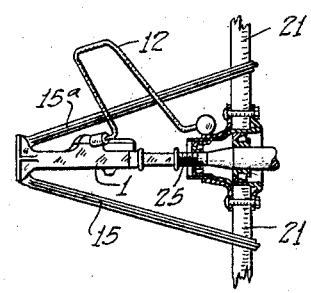
Fig. 8 is a perspective view, partly broken away, when used as a wheel puller.

The uses of the tool as a jack are clearly obvious from the perspective shown in Fig. 5. It is likewise readily understood how a rim may be contracted as shown in Fig. 6, or expanded as shown in Fig. 7.

When my universal wheel tool is used as a wheel puller, the two gripping arms 15 and 15ª are turned at less than a right angle to the major axis of the hollow housing 1, and grip the spokes 21 of the wheel by means of either of the hooked portions 18 and 19.

One end of the movable member 6 is placed against the end of the axle 25, either directly or with a suitable pin or lug intervening, the wheel cap and nut having been previously removed. By turning the brace 12, it is obvious that the wheel will be withdrawn from the axle.

Since the tendency of the pinion 11, meshing with the cogs of the rack 3, is to force the rack against the opposite side of the housing 1, it is readily understood that the factor of friction would be very great if not relieved by the rollers 4 and 5. It is, also, apparent that by means of the adjusting screw-threaded member 6, the lifting range of the jack will be very materially increased.

Having fully described my invention, what I claim as new and useful and desire to secure by Letters Patent is:

A universal wheel tool of the character described, comprising a hollow housing, a worm, a worm wheel, a pinion, a rack reciprocable in said housing, roller bearings adapted to reduce the friction when said rack is reciprocated, an extensible head detachably mounted upon said rack, means for rotating said worm, a plurality of gripping arms having a plurality of hooks upon one end adapted to grip and hold a rim or spoke and having their opposite ends grooved adapted to pivotally engage bearings in the base of said hollow housing and also adapted to rotate about said bearings through approximately one hundred and eighty degrees.

In witness whereof I have hereunto affixed my signature this 16 day of May 1925.

JOHN A. SMITH.